(12) United States Patent
Podilchuk (10) Patent No.: US 7,773,811 B2
(45) Date of Patent: Aug. 10, 2010

(54) METHOD AND SYSTEM FOR SEARCHING A DATABASE OF GRAPHICAL DATA

(75) Inventor: Christine Podilchuk, Warren, NJ (US)

(73) Assignee: D & S Consultants, Inc., Eatontown, NJ (US)

(*) Notice: Subject to any disclaimer, the term of this patent is extended or adjusted under 35 U.S.C. 154(b) by 422 days.

(21) Appl. No.: 11/950,365

(22) Filed: Dec. 4, 2007

(65) Prior Publication Data

US 2008/0273801 A1    Nov. 6, 2008

Related U.S. Application Data

(60) Provisional application No. 60/873,179, filed on Dec. 6, 2006.

(51) Int. Cl.
G06K 9/68  (2006.01)
G06K 9/62  (2006.01)
G06K 9/54  (2006.01)
G06K 9/60  (2006.01)

(52) U.S. Cl. .................. 382/218; 382/209; 382/159; 382/305

(58) Field of Classification Search ......... 382/305–307, 382/209–220, 159, 160, 162–172
See application file for complete search history.

(56) References Cited

U.S. PATENT DOCUMENTS 4,503,557 A   3/1985   Maeda (Continued)

FOREIGN PATENT DOCUMENTS

EP    0949580    2/2001

(Continued)

OTHER PUBLICATIONS

Podilchuk, "A New Face Recognition Algorithm Using Bijective Mappings" 2005 IEEE Comp Soc Conf on Comp Vision and Pattern Recogn, Jun. 20-26, 2005, vol. 3, pp. 165 US.

(Continued)

*Primary Examiner*—Wes Tucker
(74) *Attorney, Agent, or Firm*—Fox Rothschild LLP; Dennis M. Carleton (57) ABSTRACT

A method and system for searching a database of graphical data are described. Embodiments of the invention use accelerated image-comparing techniques based on application of the Levenshtein algorithm for matching or searching one-dimensional data strings to recognizing pre-selected targets in graphical contents of 2D images.

25 Claims, 4 Drawing Sheets

U.S. PATENT DOCUMENTS

| | | | |
|---|---|---|---|
| 4,901,362 | A | 2/1990 | Terzian |
| 5,459,739 | A | 10/1995 | Handley |
| 5,751,286 | A | 5/1998 | Barber |
| 5,757,959 | A | 5/1998 | Lopresti |
| 5,761,538 | A | 6/1998 | Hull |
| 5,832,474 | A | 11/1998 | Lopresti et al. |
| 5,875,446 | A | 2/1999 | Brown |
| 5,940,778 | A | 8/1999 | Marfurt et al. |
| 6,104,835 | A | 10/2000 | Burges |
| 6,161,130 | A | 12/2000 | Horvitz |
| 6,295,371 | B1 | 9/2001 | Rucklidge |
| 6,581,034 | B1 | 6/2003 | Choi |
| 6,616,704 | B1 | 9/2003 | Birman |
| 6,629,097 | B1 * | 9/2003 | Keith ............................... 1/1 |
| 6,633,857 | B1 | 10/2003 | Tipping |
| 6,741,725 | B2 | 5/2004 | Astle |
| 6,898,469 | B2 | 5/2005 | Bickford |
| 6,915,009 | B2 | 7/2005 | Foote |
| 6,944,602 | B2 | 9/2005 | Cristianin |
| 6,990,217 | B1 | 1/2006 | Moghaddam |
| 7,054,847 | B2 | 5/2006 | Hartman |
| 7,065,521 | B2 * | 6/2006 | Li et al. ............................... 1/1 |
| 7,246,314 | B2 * | 7/2007 | Foote et al. ................. 715/700 |
| 2001/0045979 | A1 * | 11/2001 | Matsumoto et al. ........... 348/43 |
| 2004/0243567 | A1 * | 12/2004 | Levy ............................... 707/3 |
| 2005/0129290 | A1 | 6/2005 | Lo |
| 2005/0147302 | A1 | 7/2005 | Leung |
| 2006/0107823 | A1 | 5/2006 | Platt |
| 2006/0112068 | A1 | 5/2006 | Zhang |
| 2006/0251339 | A1 | 11/2006 | Gokturk |

OTHER PUBLICATIONS

Hsuan Shih, Lee, "A Fast Algorithm for Computing the Transitive Closure [etc]," IEEE Proc of the Int ICSC Cong on Comp Intel Meth and Appl, pub. 1999 (Jun. 22-25, 1999) US.

Bhatnagar et al "Syntactic Pattern Recognition of HRR Signatures," SPIE Proc. v 4053, 190, pp. 452-466, Soc of Photo-Opt Instrum Engineers, Bellingham WA (2000).

Oommenn et al "On Using Parametric String Databases and Vector Quantization [etc]," IEEE Proc. Int. Conf. on Sys, Man and Cyber, v 1, p. 511-517 IEEE, Piscataway NJ (1997).

Chen, "Fast Schemes for Computing Similarities Between Gaussian HMMs [etc]" EURASIP Jour on Appl Sign Pro (EURASIP J. Appl. Sig Pro v 2005, n13, Aug. 1, 2005 p. 1984-1993 US.

Asano, "Efficient Algorithms for Optimization-Based Image Segmentation" (NDN-174-0695-5802-4) IEEE Int Jour of Comp Geo & App, v11, No. 2, 2001 p. 145-166 US.

Menico, "Faster String Searches (Boyer-Moore Algorithm)" Dr. Dobb's Jour of Software Tools, v14 n7 pub Jul. 1989 p. 74-78 (US).

* cited by examiner

METHOD AND SYSTEM FOR SEARCHING A DATABASE OF GRAPHICAL DATA

CROSS-REFERENCE TO RELATED APPLICATIONS

This application claims benefit of U.S. provisional patent application Ser. No. 60/873,179, filed on Dec. 6, 2006, which is herein incorporated by reference in its entirety, and U.S. non-provisional patent application Ser. No. 11/619,104, filed on Jan. 2, 2007, which is incorporated herein by reference in its entirety.

FIELD OF THE INVENTION

The present invention relates generally to the field of techniques for analyzing graphical data and, in particular, methods and systems for computerized searching databases of 2D images.

BACKGROUND OF THE INVENTION

Recognition of objects of interest (referred to herein as "targets") in graphical contents of 2D images is used by military, law enforcement, commercial, and private entities. Typically, the goal of target recognition is identification or monitoring of one or more targets depicted in images produced by surveillance apparatuses or images stored in respective databases or archives. In various applications, target recognition may be performed in real time or, alternatively, using pre-recorded data.

It has been recognized in the art that there are difficulties associated with computerized, i.e., automated, comparing of the graphical contents of images. In particular, many challenges in the field of computerized target recognition relate to identification of targets that change their appearance due to orientation, lighting conditions, or partial occlusions.

Despite the considerable effort in the art devoted to techniques for searching databases of graphical data, further improvements would be desirable.

SUMMARY OF THE INVENTION

One aspect of the invention provides a method for searching a database of graphical data, such as pre-stored reference images. The method is directed to determining a degree of similarity between a query image and the reference images based on a similarity score between the images, wherein the similarity score is defined as a complement to a pictorial edit distance, which is asserted as a weighted sum of a 2D representation of Insertion, Deletion, and Substitution Error terms of the Levenshtein algorithm for matching or searching one-dimensional data strings.

In one embodiment, the method includes generating a matrix of similarity scores of the reference images, in which each reference image forms a diagonal matrix element and similarity scores of the reference images one versus another form non-diagonal matrix elements, and determining similarity scores of a query image versus the reference images.

If a similarity score is greater than a pre-selected threshold, the method determines that the query image and reference images are graphically identical, otherwise the method excludes the reference image from further consideration and continues to define, in a row or a column intersecting a diagonal of the matrix at a position relating to that reference image, a matrix element having, with the reference image, the highest similarity score.

If a similarity score of the query image with a reference image used for generating that matrix element is greater than the pre-selected threshold, the method defines the respective reference image as graphically identical to the query image, otherwise the method continues such cycles of comparing the query and reference images to identify the reference images having with the query image the similarity scores greater than the pre-selected threshold.

Another aspect of the present invention provides a system using the inventive method for searching a database of graphical data.

Various other aspects and embodiments of the invention are described in further detail below.

The Summary is neither intended nor should it be construed as being representative of the full extent and scope of the present invention, which these and additional aspects will become more readily apparent from the detailed description, particularly when taken together with the appended drawings.

To facilitate understanding, identical reference numerals have been used, where possible, to designate similar elements that are common to the figures, except that suffixes may be added, when appropriate, to differentiate such elements. The images in the drawings are simplified for illustrative purposes and have not necessarily been drawn to scale.

The appended drawings illustrate exemplary embodiments of the invention and, as such, should not be considered as limiting the scope of the invention that may admit to other equally effective embodiments. It is contemplated that features or steps of one embodiment may beneficially be incorporated in other embodiments without further recitation.

DETAILED DESCRIPTION

Figure 1:
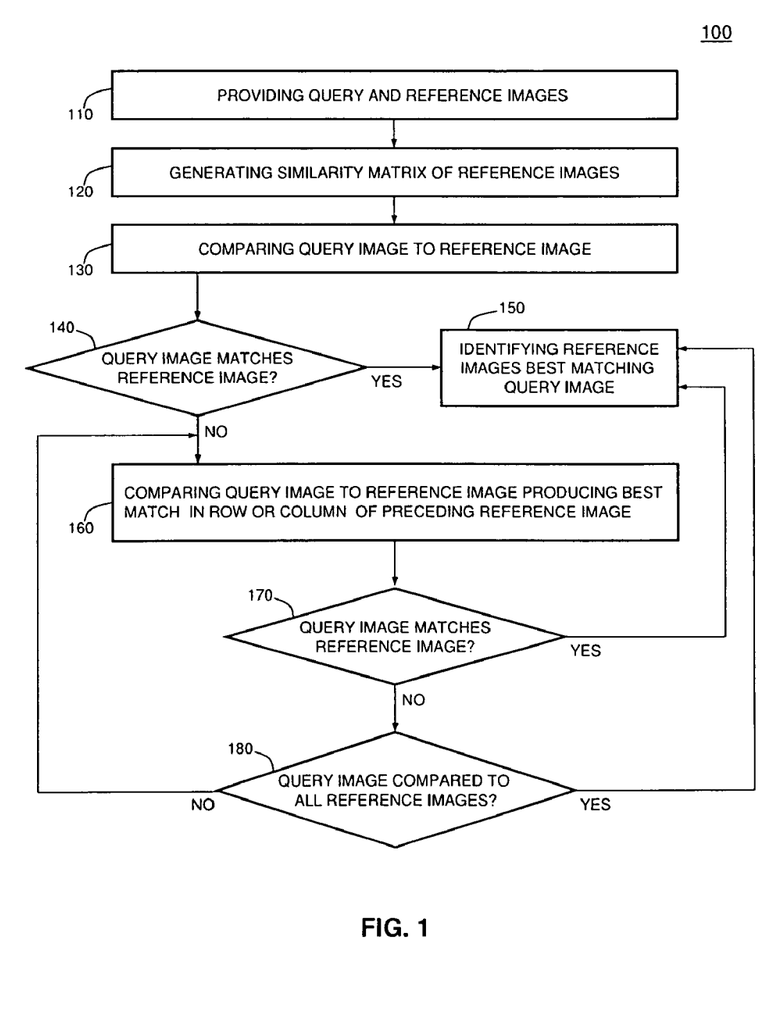
FIG. 1 is a flow diagram illustrating a method for searching a database of graphical data in accordance with one embodiment of the present invention.
Figure 2:
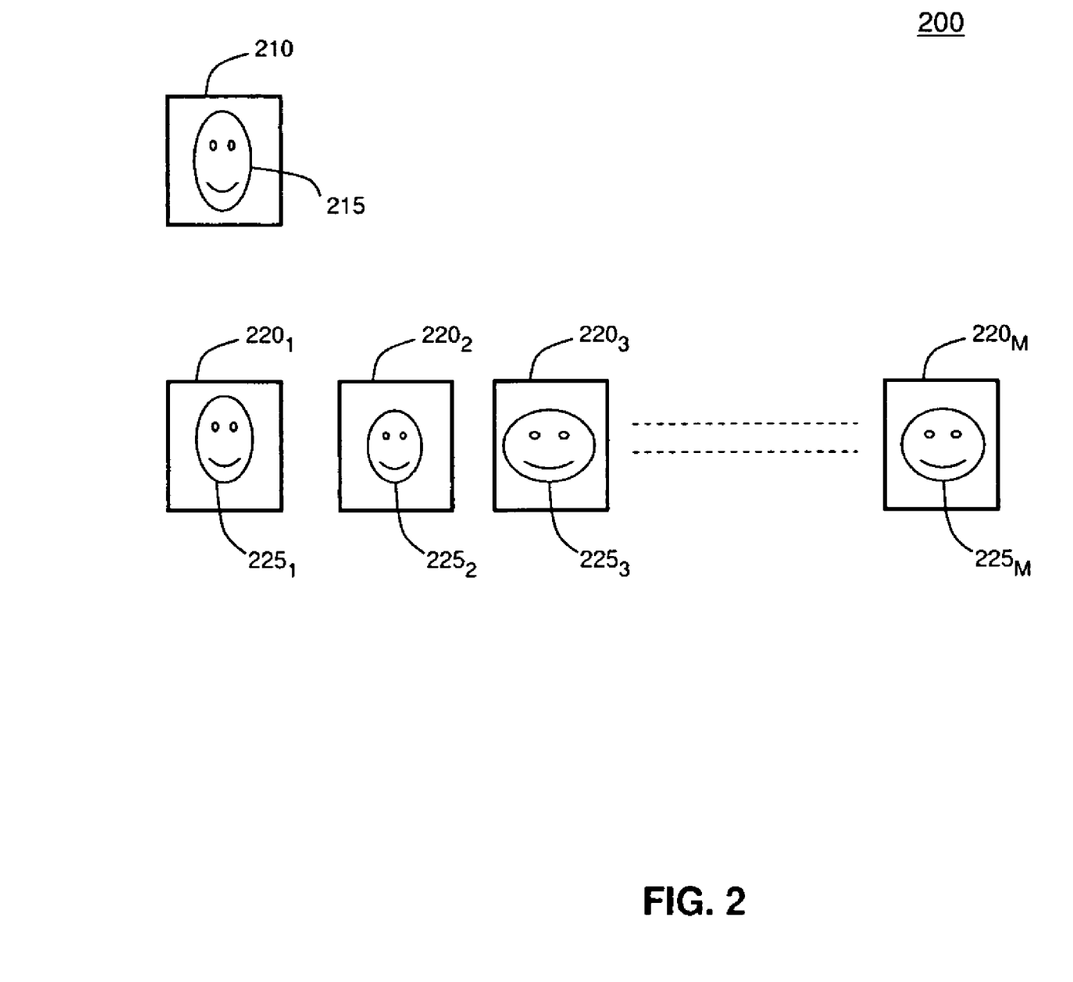
FIG. 2 is a schematic diagram depicting exemplary images compared using the method of FIG. 1.
Figure 3:
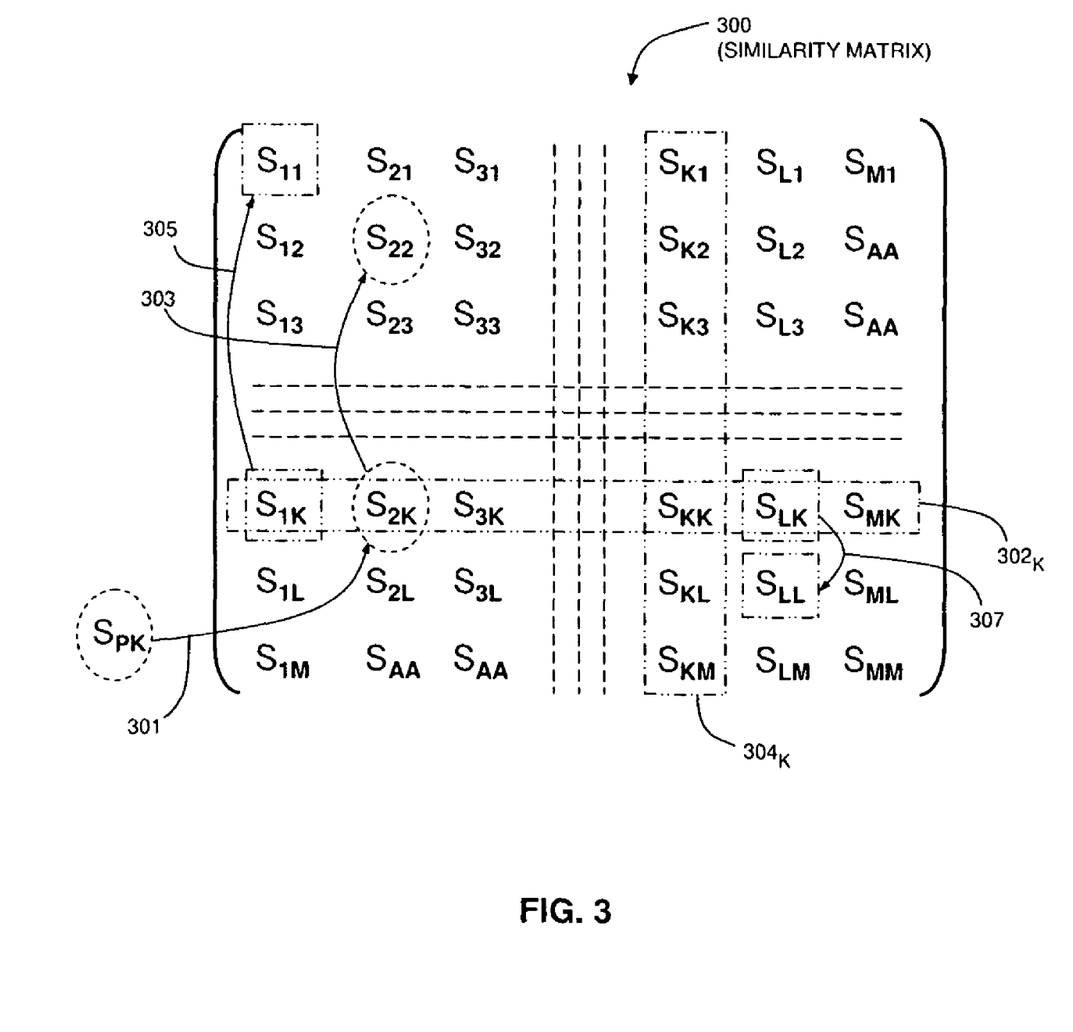
FIG. 3 is a schematic diagram illustrating the method of FIG. 1.

Referring to the figures, FIG. 1 depicts a flow diagram illustrating a method 100 for searching a database of graphical data in accordance with one embodiment of the present invention, and FIGS. 2-3 depict schematic diagrams 200 and 300 illustrating the method 100. To best understand the invention, the reader should refer to FIGS. 1-3 simultaneously.

In various embodiments, method steps of the method 100 are performed in the depicted order or at least two of these steps or portions thereof may be performed contemporaneously, in parallel, or in a different order. For example, portions of steps 150 and 160 may be performed contemporaneously or in parallel. Those skilled in the art will readily appreciate that the order of executing at least a portion of other discussed below processes or routines may also be modified.

Aspects of the present invention are illustratively described below within the context of images depicting live objects such as humans or body parts thereof. The invention may also be utilized within context of images depicting material objects, such as missiles or their plumes, vehicles, objects floating in air, free space, or liquid, beams of light, and the like, as well as images depicting a combination of various live or material objects. It has been contemplated and is within the scope of the invention that the method 100 is utilized within the context of such images.

At step 110, referring to FIG. 2, a 2D image 210 (referred to hereafter as a "query image") and a plurality of M pre-stored 2D images 220 (referred to hereafter as a "reference images") are provided, where M is an integer. In one embodiment, the reference images 220 are stored in a database of a computerized system or apparatus for comparing images (discussed below in reference to FIG. 4).

Illustratively, each of the reference images 220 depicts a respective object 225, which is compared to a target 215 depicted in the query image 210. Generally, the target 215 and objects 225 are depicted surrounded by live or material elements of their respective conventional habitats, conditions, or environments. For a purpose of graphical clarity, in the images 210 and 220 such elements are not shown.

Herein, the method 100 is discussed referring to the reference and query images depicting a single object (reference images 220) or a single target (query image 210). In alternate embodiments, reference and query images depicting several such objects or targets may similarly be compared using processing steps of the method 100.

In the depicted exemplary embodiment, the query and reference images 210, 220 are digitized 2D images having the same digital resolution (i.e., number of pixels per unit of area), and their graphical contents (i.e., target 215 and objects 225) have approximately the same physical dimensions, or scale factors.

Generally, at least a portion of these properties in available samples of query and reference images may differ from one another or at least one of the query and reference images 210, 220 may be a portion of a larger image plane. At step 110, respective properties of such query and reference images are normalized.

In particular, a normalization process may adjust scale factors or digital resolution of the query or reference images, equalize or approximately equalize physical dimensions of particular elements in the images or the images themselves, produce copies of the query and reference images having different digital resolutions, and the like. Such normalization of the images increases probability and reduces computational complexity of recognizing the target 215 in graphical contents of the reference images 220.

At step 120, referring to FIG. 3, a similarity matrix 300 of the reference images 220 is generated. Matrix elements $S_{ij}$ of the similarity matrix 300 are defined as similarity scores between reference images $220_i$ and $220_j$, where i and j are integers, i+j=M and L=M−1, K=L−1. In the similarity matrix 300, each reference image 220 forms a diagonal matrix element, and similarity scores of the reference images 220 one versus another form non-diagonal matrix elements.

Diagonal matrix elements (i.e., matrix elements $S_{ii}$ or $S_{jj}$) relate to similarity scores of the respective reference images versus themselves and, as such, are unity matrix elements (i.e., matrix elements which numerical value is equal to 1). Correspondingly, since similarity scores $S_{ij}$ and $S_{ji}$ for the respective reference image $220_{ij}$ and $220_{ji}$ are equal to one another, the similarity matrix 300 is a symmetric matrix. Numerical value of the non-diagonal matrix elements is disposed in a range from 0 to 1.

A similarity score between reference images $220_i$ and $220_j$ is defined as a complement to a pictorial edit distance (PED), which is asserted as a weighted sum of a 2D representation of Insertion, Deletion, and Substitution Error terms of the Levenshtein algorithm for matching or searching one-dimensional data strings. Techniques for determining PEDs and similarity scores are disclosed in detail in commonly assigned U.S. patent application Ser. No. 11/61913, filed on Jan. 2, 2007, and Ser. No. 11/619,092, filed on Jan. 2, 2007, all of which are herein incorporated by reference. Techniques for determining PEDs and similarity scores and comparing images using these properties are further disclosed in the commonly assigned U.S. patent applications by C. Podilchuk entitled "Method and System for Comparing Images Using a Pictorial Edit Distance," Ser. No. 11/947,726 filed Nov. 29, 2007, and "Method and System for Searching Multimedia Content," Ser. No. 11/947,734 filed Nov. 29, 2007, both of which are incorporated herein by reference in their entirety. Salient features of these techniques are briefly discussed below.

To determine the similarity score between reference image $220_i$ and $220_j$, an image disparity map is calculated for these images using a respective block matching algorithm. Using cost functions such as, for example, a mean absolute difference (or L1 error) or a mean square error (or L2 error), the image disparity map identifies disparity between pre-selected elementary blocks of pixels in the reference image $220_i$ and $220_j$ as a weighted sum of the one-to-many, one-to-none, and matching error correspondences between the blocks of pixels.

These types of correspondences are expressed in terms of the Levenshtein algorithm as follows: (i) one-to-many correspondence between the elementary blocks is asserted as an equivalent of an Insertion term, (ii) one-to-none correspondence between the elementary blocks is asserted as an equivalent of a Deletion term, (iii) partial matching between the elementary blocks is asserted as an equivalent of a Substitution Error term, and (iv) a PED between the compared images is asserted as an equivalent of the Levenshtein's Edit Distance.

The term "one-to-many correspondence" relates to an elementary block matching, with a cost function smaller than a first pre-determined threshold Q1, two or more elementary blocks of the other image. Accordingly, the term "one-to-none correspondence" relates to an elementary block having no match among the elementary blocks of the other image (i.e., elementary block which cost function, with respect to the elementary blocks of the other image, is greater than a second pre-determined threshold Q2). The term "partial matching" relates to the elementary blocks which cost functions, with respect to the elementary blocks of the other image, are disposed between Q1 and Q2, i.e., $Q1 \leq Q \leq Q2$.

At step 130, a similarity score between the query image 210 and one of the reference images 220 (for example, similarity score $S_{qk}$ between the query image 210 and a reference image $220_k$, where k is an integer and $k \leq M$). The reference image $220_k$ may be a randomly selected image or an image having certain common features with the query image 210.

At step 140, the method 100 queries if the similarity score $S_{qk}$ exceeds a pre-selected threshold T for numerical values of the similarity scores $S_{ij}$. If the query of step 140 is affirmatively answered, the method 100 determines that the target 215 depicted in the query image 210 and the object $225_k$ depicted in the reference image $220_k$ are graphically identical and proceeds to step 150, where the reference image $220_k$ is recorded as a match for the query image 210. If the query of step 140 is negatively answered, the method 100 proceeds to step 160. In some embodiments, at step 140, such reference image $220_k$ is excluded from further consideration.

At step 160, the method 100 compares the similarity score between the query image 210 and a preceding reference image 220 (e.g., similarity score $S_{qk}$ between the query image 210 and the reference image $220_k$) with similarity scores between that reference image and other reference images 220 and selects the next reference image 220 for comparing with the query image 210.

The latter similarity scores are defined by matrix elements of the respective row or column of the similarity matrix 300 that include the preceding reference image (e.g., matrix elements $S_{ik}$ or $S_{kj}$ in the row $302_k$ (matrix elements $S_{ik}$) or column $304_k$ (matrix elements $S_{kj}$)). The next reference image 220 is a reference element that, with the preceding reference image 220 (i.e., reference image $220_k$), has a closest similarity score in such a row or column (i.e., "k" row or "k" column) of the similarity matrix 300.

In an alternate embodiment, the reference images 220, which similarity scores with the preceding reference image (e.g., reference image $220_k$) are greater or smaller than respective pre-set thresholds, may be excluded from further consideration.

In particular, in case of the reference image $220_k$, the method 100 defines (i) a matrix element $220_{xk}$ in the row $302_k$ (or a matrix element $220_{kx}$ in column $304_k$) having with the reference image $220_k$ the closest similarity score, and (ii) a reference image $220_x$ that produces, together with the reference image $220_k$, that matrix element, where x in an integer between 1 and M. Then, the method 100 calculates a similarity score between the query image 210 and the defined reference image $220_x$.

Referring to FIG. 3, illustratively, a matrix element $S_{2k}$ in the row $302_k$ provides the best match (shown with an arrow 301) with the similarity score $S_{qk}$, and step 160 calculates a similarity score $S_{q2}$ between the query image 210 and a reference image 2202 (shown with an arrow 303). Matrix elements $S_{1k}$ and $S_{Lk}$, illustratively, differ from the similarity score $S_{qk}$ by more than a certain pre-selected value, and, in some embodiments, the corresponding reference images $220_1$ and $220_L$ may be excluded from further consideration (shown with an arrows 305 and 307, respectively). Since the similarity matrix 300 is a symmetrical matrix, the same considerations apply to the matrix elements $S_{2k}$ and $S_{k2}$, $S_{1k}$ and $S_{k1}$, and $S_{Lk}$ and $S_{kL}$, respectively.

At step 170, the method 100 queries if the similarity score between the query image 210 and the compared reference 220 image exceeds the threshold T. If the query of step 170 is affirmatively answered, the method 100 proceeds to step 150, where said compared reference image is recorded as a match for the query image 210. If the query of step 170 is negatively answered, the method 100 proceeds to step 180.

At step 180, the method 100 queries if all reference elements 220 were compared to the query image 210. If the query of step 180 is negatively answered, the method 100 proceeds to step 160 where the next reference element 220 is defined and compared to the query image 210, as discussed above referring to the reference image $220_k$. If the query of step 180 is affirmatively answered, the method 100 proceeds to step 150, where terminates recoding of the reference images 220 having objects 225 that match the target 215.

In one alternate embodiment, searching the database is terminated after a pre-determined number of the reference images 220 (for example, one reference image), which similarity scores with the query image 210 are greater than the threshold T, is identified. In another alternate embodiment, step 150 further identifies the reference image 220 having the highest similarity score with the query image 210.

In exemplary embodiments, the method 100 may be implemented in hardware, software, firmware, or any combination thereof in a form of a computer program product comprising computer-executable instructions. When implemented in software, the computer program product may be stored on or transmitted using a computer-readable medium adapted for storing the instructions or transferring the computer program product from one computer to another.

Figure 4:
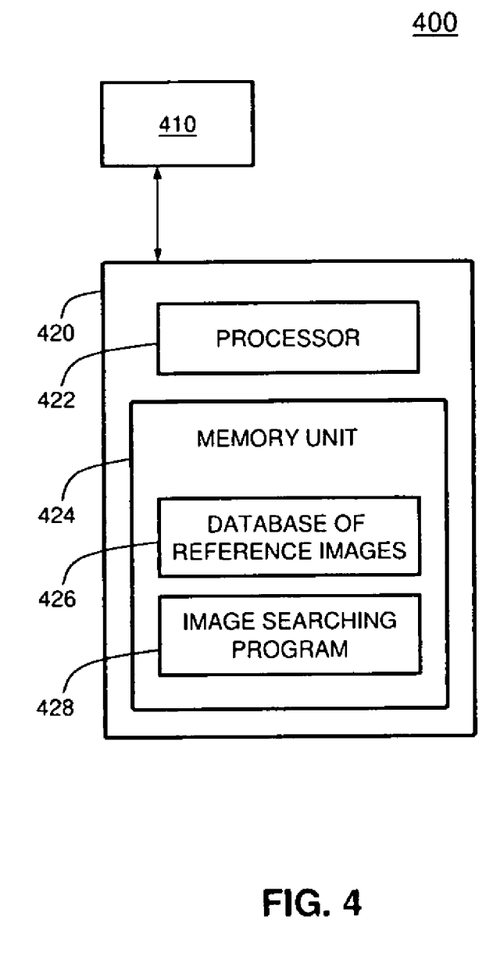
FIG. 4 is a high-level, schematic diagram of an exemplary system using the method of FIG. 1.

FIG. 4 is a high-level, schematic diagram of an exemplary system 400 using the method 100. The system 400 illustratively includes an analyzer 420 and a source 410 of one or more query images 210.

In one embodiment, the analyzer 420 is a computer having a processor 422 and a memory unit 424. The memory unit 424 includes a database 426 of reference images 220 and an image searching program, or software, 428. The image searching program 428 encodes, in a form of computer instructions, the method 100. When executed by the processor 422, the program 428 performs processing steps of the method 100. In an alternate embodiment, the database 426 may be a portion of a remote apparatus (not shown) coupled to the analyzer 420.

In alternate embodiments, at least some of the image searching program 428 and database 426 of reference images 220 may reside on a removable magnetic or optical media (e.g., flash memory card or drive, compact disc (CD), DVD, Blu-Ray and/or HD optical disks and the like) (not shown) or any other storage medium (not shown), including magnetic media such has hard disk drives, tapes, and the like, including media coupled to the computer 420 by way of a network (not shown), such as a wide area network (WAN), local area network (LAN) or the Internet.

The source 410 is generally a digital video-recording device (for example, digital camera, digital video camera, and the like), an image-digitizing device (for example, a scanner), or a remote data storage adapted for communicating with the analyzer 420. In an alternate embodiment, the query image(s) 210 may be selected from images contained in the database 426 (i.e., from reference images 220).

Although the invention herein has been described with reference to particular illustrative embodiments, it is to be understood that these embodiments are merely illustrative of the principles and applications of the present invention. Therefore numerous modifications may be made to the illustrative embodiments and other arrangements may be devised without departing from the spirit and scope of the present invention, which is defined by the appended claims.

What is claimed is:

1. A method for searching a database of graphical data, said data including a plurality of reference images, comprising:
   (a) generating a matrix of similarity scores of the reference images, each reference image forming a unity diagonal matrix element and similarity scores of the reference images one versus another forming non-diagonal matrix elements;
   (b) determining a similarity score of a query image versus a reference image;
   (c1) if the similarity score defined at the step (b) is greater than a pre-selected threshold:
      determining that the query image and said reference image are graphically identical;
   (c2) if the similarity score defined at the step (b) is smaller than the pre-selected threshold:
      defining, in a row or a column intersecting a diagonal of the matrix at a position relating to said reference image, a matrix element having a closest similarity score with said reference image;
   (d) determining a similarity score of the query image with a reference image used for generating the matrix element defined at the step (c2);
   (e1) if the similarity score defined at the step (d) is greater than the pre-selected threshold:

determining that graphical contents of the query image and the reference image of the step (d) are graphically identical; and (e2) if the similarity score defined at the step (d) is smaller than the pre-selected threshold:

cyclically repeating the steps (c1) through (e1) and replacing in each cycle a preceding reference image with a reference image used to generate a matrix element having, in a row or a column intersecting a diagonal of the matrix at a location relating to the preceding reference image, a closest similarity score with the preceding reference image; and identifying the reference images which similarity scores with the query image are greater than the pre-selected threshold as graphically identical with the query image, wherein the similarity score is defined as a complement to a pictorial edit distance, which is asserted as a weighted sum of a 2D representation of Insertion, Deletion, and Substitution Error terms of the Levenshtein algorithm for matching or searching one-dimensional data strings.

2. The method of claim 1, wherein the step (b) comprises: presenting the query image in a digital format.

3. The method of claim 2, further comprising:
matching at least one of a digital resolution or a scale factor of the query image with a digital resolution and a scale factor of the reference images.

4. The method of claim 1, wherein the query image or at least some of the reference images are portions of larger image planes.

5. The method of claim 1, wherein the pictorial edit distance is determined using a pre-determined block matching algorithm for comparing (i) matrices of blocks of pixels of the reference images or (ii) matrices of blocks of pixels of the query image and the reference images.

6. The method of claim 5, wherein a degree of correlation between the blocks of pixels is expressed using the terms of the Levenshtein algorithm as follows:

defining one-to-many correspondence between the blocks of pixels as an equivalent of an Insertion term;

defining one-to-none correspondence between the blocks of pixels as an equivalent of a Deletion term; and defining a cost function associated with partial matching between the blocks of pixels as an equivalent of a Substitution Error term.

7. The method of claim 6, further comprising:
asserting the one-to-many correspondence between the blocks of pixels when a value of the cost function is smaller than a first pre-determined threshold;

asserting the one-to-none correspondence between the blocks of pixels when a value of the cost function is greater than a second pre-determined threshold; and asserting partial correspondence between the blocks of pixels when a value of the cost function is disposed between the first and second pre-determined thresholds.

8. The method of claim 7, wherein the value of the cost function is based of a mean absolute difference or a mean square error between the blocks of pixels.

9. The method of claim 1, further comprising at least one of:

excluding, at the step (c2), said reference image from further consideration; and excluding, at the steps (c2) or (e2), from further consideration the reference images generating in said row or column matrix elements having the similarity scores smaller or greater than pre-set thresholds.

10. The method of claim 1, further comprising:
terminating searching the database after a pre-determined number of the reference images, which similarity scores with the query image are greater than the pre-selected threshold, is identified; and identifying a reference image having the highest similarity score with the query image.

11. The method of claim 1, further comprising:
terminating searching the database after a first reference image which similarity score with the query image is greater than the pre-selected threshold is identified.

12. The method of claim 1, further comprising:
terminating searching the database when a particular portion of a graphical content of the query image is identified in a pre-determined number of the reference images.

13. An apparatus or system executing the method of claim 1.

14. A computer readable medium storing software that, when executed by a processor, causes an apparatus or system to perform the method of claim 1.

15. A system for comparing images, comprising:
a database of graphical data, said data including reference images;

a source of one or more query images; and an analyzer of the database and query images, the analyzer adapted to execute software having instructions causing the analyzer to perform the steps of:

(a) generating a matrix of similarity scores of the reference images, each reference image forming a unity diagonal matrix element and similarity scores of the reference images one versus another forming non-diagonal matrix elements;

(b) determining a similarity score of a query image versus a reference image;

(c1) if the similarity score defined at the step (b) is greater than a pre-selected threshold:

determining that the query image and said reference image are graphically identical;

(c2) if the similarity score defined at the step (b) is smaller than the pre-selected threshold:

defining, in a row or a column intersecting a diagonal of the matrix at a position relating to said reference image, a matrix element having a closest similarity score with said reference image;

(d) determining a similarity score of the query image with a reference image used for generating the matrix element defined at the step (c2);

(e1) if the similarity score defined at the step (d) is greater than the pre-selected threshold:

determining that graphical contents of the query image and the reference image of the step (d) are graphically identical; and (e2) if the similarity score defined at the step (d) is smaller than the pre-selected threshold:

cyclically repeating the steps (c1) through (e1) and replacing in each cycle a preceding reference image with a reference image used to generate a matrix element having, in a row or a column intersecting a diagonal of the matrix at a location relating to the preceding reference image, a closest similarity score with the preceding reference image; and identifying the reference images which similarity scores with the query image are greater than the pre-selected threshold as graphically identical with the query image, wherein the similarity score is defined as a complement to a pictorial edit distance, which is asserted as a weighted sum of a 2D representation of Insertion, Deletion, and Substitution Error terms of the Levenshtein algorithm for matching or searching one-dimensional data strings.

16. The system of claim 15, wherein the analyzer is a computer or a portion thereof.

17. The system of claim 15, wherein the database is a portion of the analyzer.

18. The system of claim 15, wherein the database is a portion of a remote apparatus coupled to the analyzer.

19. The system of claim 15, wherein the source of the one or more query images is a portion of the database.

20. The system of claim 15, wherein the source of the one or more query images is a remote device adapted for communicating to the analyzer.

21. The system of claim 20, wherein said device a digital video-recording device, an image-digitizing device, or a remote data storage.

22. The system of claim 15, wherein the query image or at least some of the reference images are portions of larger image planes.

23. The system of claim 15, further adapted to at least one of:
excluding, at the step (c2), said reference image from further consideration; and
excluding, at the steps (c2) or (e2), from further consideration the reference images generating in said row or column matrix elements having the similarity scores smaller or greater than pre-set thresholds.

24. The system of claim 15, further adapted to:
terminating searching the database after a pre-determined number of the reference images, which similarity scores with the query image are greater than the pre-selected threshold, is identified; and
identifying a reference image having the highest similarity score with the query image.

25. The system of claim 15, further adapted to:
terminating searching the database when a particular portion of a graphical content of the query image is identified in a pre-determined number of the reference images.

* * * * *